(12) United States Patent
Cruthis et al.

(10) Patent No.: US 12,350,240 B1
(45) Date of Patent: Jul. 8, 2025

(54) ENHANCED INFANT PACIFIER

(71) Applicants: Thomas Cruthis, Jamestown, NC (US);
Stephanie Cruthis, Jamestown, NC (US)

(72) Inventors: Thomas Cruthis, Jamestown, NC (US);
Stephanie Cruthis, Jamestown, NC (US)

( * ) Notice: Subject to any disclaimer, the term of this patent is extended or adjusted under 35 U.S.C. 154(b) by 304 days.

(21) Appl. No.: 17/974,476

(22) Filed: Oct. 26, 2022

(51) Int. Cl.
*A61J 17/00* (2006.01)
*G01S 19/14* (2010.01)
*H02J 7/02* (2016.01)

(52) U.S. Cl.
CPC ........... *A61J 17/001* (2015.05); *A61J 17/101* (2020.05); *G01S 19/14* (2013.01); *H02J 7/02* (2013.01)

(58) Field of Classification Search
CPC ....... A61J 17/001; A61J 17/101; G01S 19/14; H02J 7/02
See application file for complete search history.

(56) References Cited

U.S. PATENT DOCUMENTS

| | | | |
|---|---|---|---|
| 6,066,161 A | 5/2000 | Parella | |
| 6,102,935 A | 8/2000 | Harlan et al. | |
| 6,809,644 B1 | 10/2004 | Titus et al. | |
| D604,858 S | 11/2009 | Neal | |
| 8,810,374 B1 | 8/2014 | Giegoldt | |
| 9,125,799 B1 | 9/2015 | Freeman | |
| 9,478,117 B2 | 10/2016 | Salina et al. | |
| 10,008,080 B1 | 6/2018 | Cooper et al. | |
| 2017/0053515 A1 | 2/2017 | Dyer | |
| 2020/0006986 A1* | 1/2020 | Kim | H02M 7/58 |
| 2022/0054363 A1* | 2/2022 | Laursen | H01F 1/057 |

* cited by examiner

*Primary Examiner* — Brooke N Labranche
(74) *Attorney, Agent, or Firm* — Cramer Patent & Design, PLLC.; Aaron R. Cramer

(57) ABSTRACT

An enhance infant pacifier is an infant pacifier with removable GPS receiver and locator system. The outer enclosure of the device includes a GPS receiver that determines the location of the pacifier. This information is then transmitted to a paired (synced) smart phone that is running a dedicated software application (app) that displays the location of the pacifier anywhere in the world. The parent or care provider can also create an audible or visual alert on the pacifier to help locate it under blankets or amongst toys. The power supply and GPS receiver is removable from the device to permit the use to clean the device without damaging the power supply and GPS receiver.

1 Claim, 5 Drawing Sheets

ENHANCED INFANT PACIFIER

RELATED APPLICATIONS

Not applicable.

FIELD OF THE INVENTION

The presently disclosed subject matter is directed to an infant pacifier and more specifically to an infant pacifier with enhanced intelligent features.

BACKGROUND OF THE INVENTION

Nothing is perhaps more frustrating than not being able to find common personal items that you just had in your hand minutes ago. These items include keys, eyeglasses, remote controls, toys, and similar objects. They become easily lost due to their small size, often falling in between seat cushions or under furniture, with no means to easily locate them. Other times, they may be accidentally carried from the room and left elsewhere in the home. However, there is perhaps no object more frustrating to lose than perhaps that of an infant pacifier. Not only is the act of looking for it is frustrating in and of itself, but when an infant is crying, the aggravation is multiplied ten-fold. Accordingly, there is a need for a means by which infant pacifiers can be easily found when misplaced. The development of the enhanced infant pacifier fulfills this need.

SUMMARY OF THE INVENTION

The principles of the present invention provide for an infant pacifier which has a pacifier body having a base plate and a nipple, an attachment collar which is disposed on the rear surface of the base plate—the attachment collar is opposite the nipple, an electronics module which is disposed within the attachment collar during use—the attachment collar is capable of being removed for washing, a release button which is disposed on the attachment collar, an indicator light and an alarm speaker which is disposed on the rear surface of the electronics module and a wireless charging pad adapted to connected to a power source.

The pacifier body may include a pair of handles. The pacifier body may include a decorative indicia. The base plate may include an attachment hole for use with a pacifier retention clip. A twisting force travel path may be applied to the pacifier body to remove the electronics module from the pacifier body along a removal travel path. Utilization of a male thread system and a female thread system may be in accordance with the twisting force travel path. The electronics module may include the male thread system which mates with the female thread system on the attachment collar of the pacifier body.

The pacifier body may provide a secure locking arrangement and prevents accidental removal of the electronics module along with alleviating one or more possible choking safety issues. The electronics module may include an internal rechargeable battery. The electronics module may be used with a plurality of the pacifier bodies. A physical pressure may be applied to the release button along the twisting force travel path to release the electronics module.

The indicator light and alarm speaker may be waterproof. The wireless charging pad may be compatible with a Qi wireless standard for inductive charging over distances of up to 40 mm. The wireless charging pad may be compatible with a wireless charging pad manufacturer selected from the group consisting of Samsung®, Apple®, Sony®, LG®, HTC®, Huawei®, Nokia®, Motorola®, or Blackberry®. The infant pacifier may receive a plurality of global positioning satellite location information via a GPS array on a first radio frequency signal. The global positioning satellite location information may then relayed to the cellular data network via a second radio frequency signal.

A plurality of location and bidirectional control data may be adapted to provide a user with the use of a personal electronic device via a third radio frequency signal. Using a dedicated application residing on the personal electronic device, the user may see a location of the infant pacifier on a map on a screen of the personal electronic device anywhere in the world.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
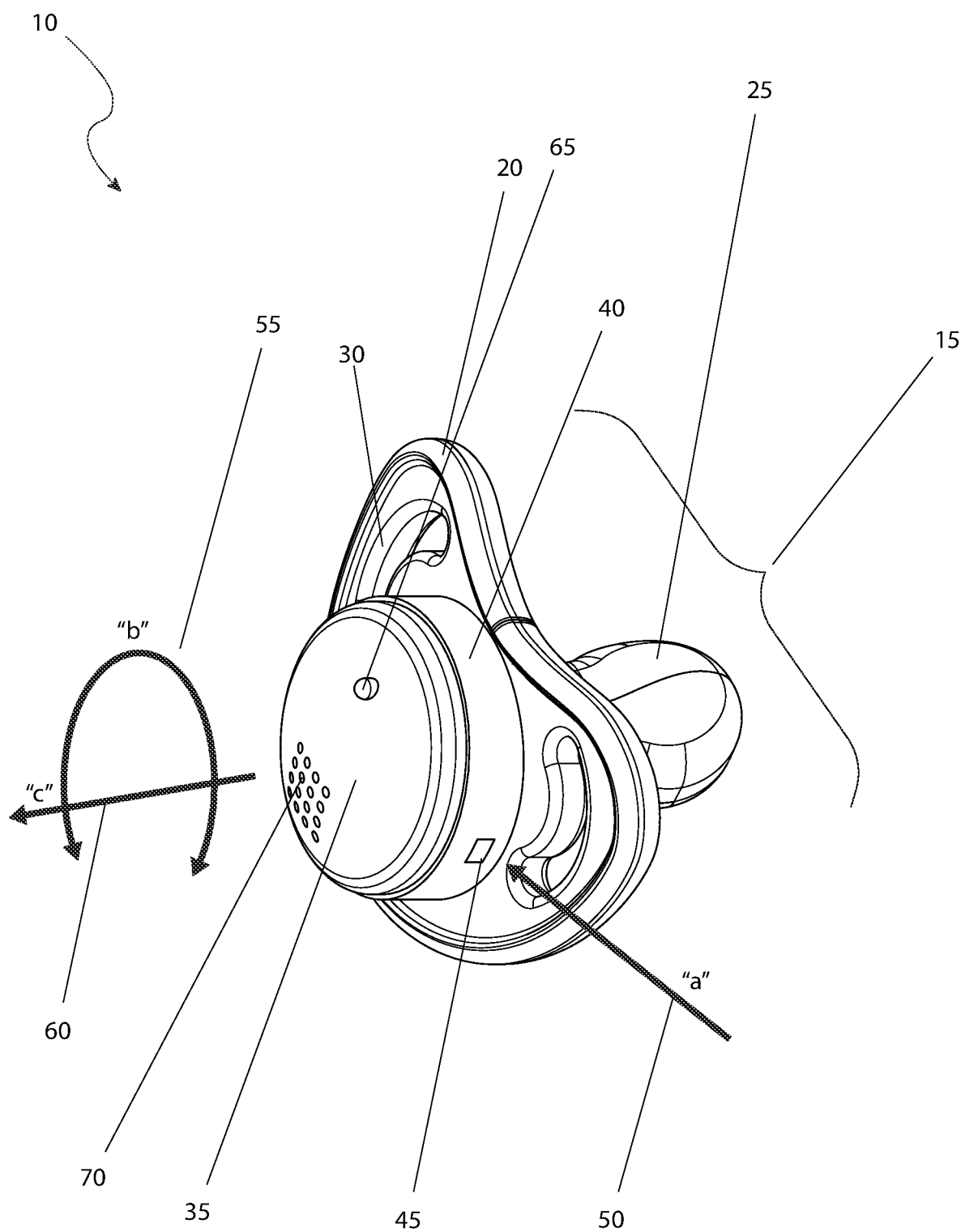
FIG. 1 is a perspective view of the infant pacifier, according to the preferred embodiment of the present invention.

DESCRIPTIVE KEY 10 infant pacifier
15 pacifier body
20 base plate
25 nipple
30 attachment hole
35 electronics module
40 attachment collar
45 release button
50 force travel path "a"
55 twisting force travel path "b"
60 removal travel path
65 indicator light
70 alarm speaker
75 male thread system
80 female thread system
85 wireless charging pad
90 rechargeable battery
95 power cable
100 power source
105 GPS array
110 first radio frequency (RF) signal
115 cellular data network
120 second radio frequency (RF) signal
125 user
130 personal electronic device
135 third radio frequency (RF) signal
140 illumination
145 audible alert 150 pickup coil
155 charge controller
160 main control circuit
165 GPS receiver
170 GPS antenna
175 cellular data transmitter
180 cellular antenna

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the infant pacifier 10, according to the preferred embodiment of the present invention is disclosed. The infant pacifier (herein also described as the "pacifier") 10, allows for its location to be determined by electronic means. The pacifier 10 provides for a pacifier body 15 having a base plate 20 and a nipple 25 as customarily expected. The pacifier body 15 may be provided with other features such as handles, decorative indicia, and the like. Such features are not necessarily required nor a limiting factor of the present invention. The base plate 20 may be provided with an attachment hole 30 for use with a pacifier retention clip. An attachment collar 40 is provided on the rear surface of the base plate 20, opposite that of the nipple 25. The electronics module 35 is retrained within an attachment collar 40 during use and may be removed for washing of the pacifier body 15. A release button 45 is located on the attachment collar 40. Physical pressure is applied to the release button 45 along a force travel path "a" 50 to release the electronics module 35. Next, a twisting force travel path "b" 55 is applied relative to the pacifier body 15 to remove the electronics module 35 from the pacifier body 15 along a removal travel path 60. This arrangement provides a secure locking arrangement and prevents accidental removal of the electronics module 35 along with alleviating possible choking safety issues. An indicator light 65 and an alarm speaker 70 are located on the rear surface of the electronics module 35. The indicator light 65 and the alarm speaker 70 are waterproof in nature. Further description and functionality of the indicator light 65 and the alarm speaker 70 will be provided herein below.

Figure 2:
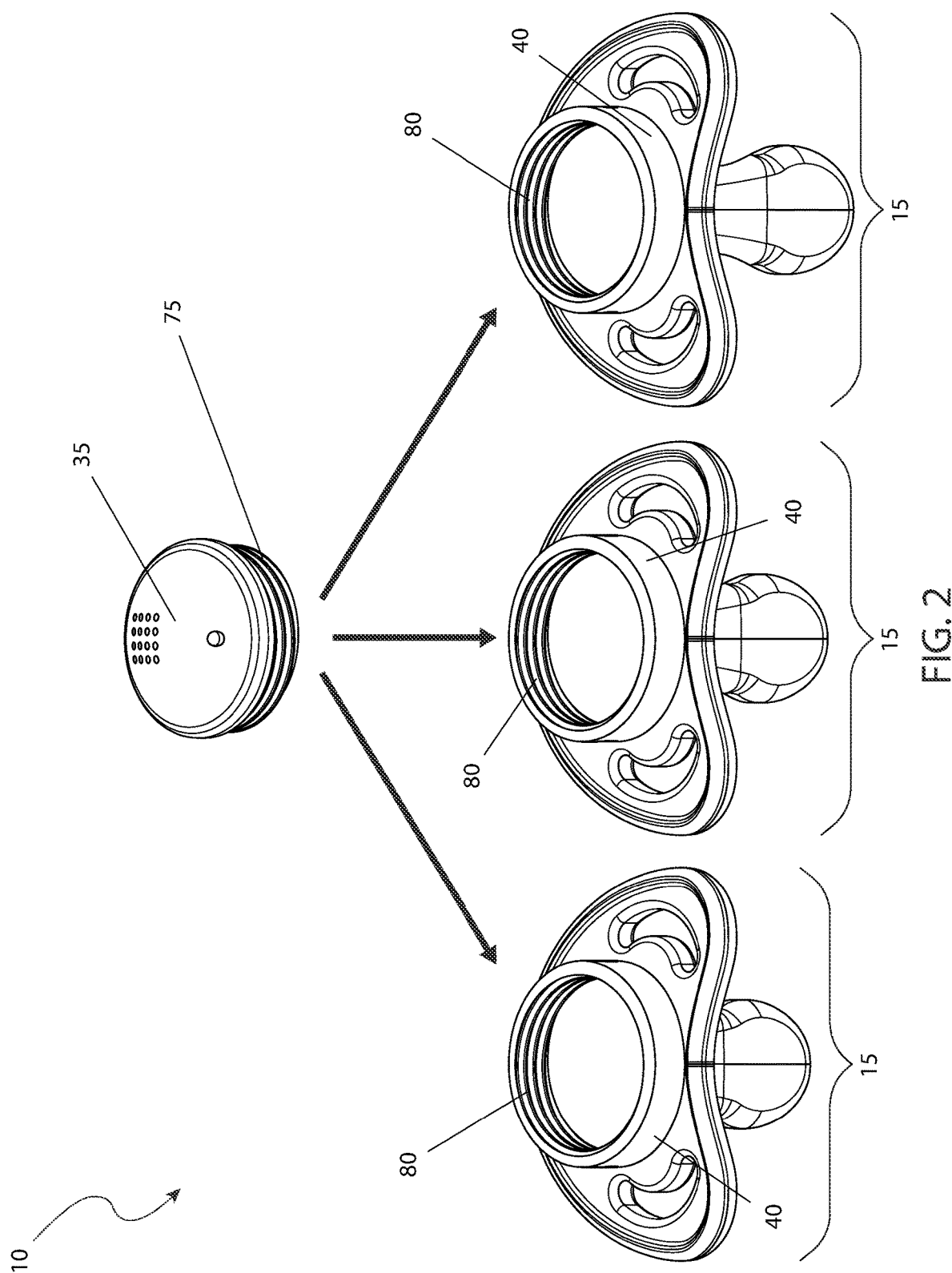
FIG. 2 is an exploded perspective view infant pacifier, according to the preferred embodiment of the present invention.

Referring next to FIG. 2, an exploded perspective view pacifier 10, according to the preferred embodiment of the present invention is depicted. A single electronics module 35 may be used with multiple pacifier body 15 as indicated. Such a feature is envisioned as beneficial should different sized pacifier body 15 be needed as a child grows. Such sizes are envisioned but not limited to birth to six months (0-6 mo.), six to eighteen months (6-18 mo.) and eighteen to thirty-six months (18-36 mo.). Other reasons for multiple pacifier body 15 with a single electronics module 35 include replace worn or damaged pacifier body 15, unavailability of pacifier body 15 due to cleaning, washing, or sanitation or the like. The electronics module 35 is provided with a male thread system 75 which mates with a female thread system 80 on the attachment collar 40 of the pacifier body 15. Utilization of the male thread system 75 and the female thread system 80 is in accordance with the twisting force travel path "b" 55 (as shown in FIG. 1).

Figure 3:
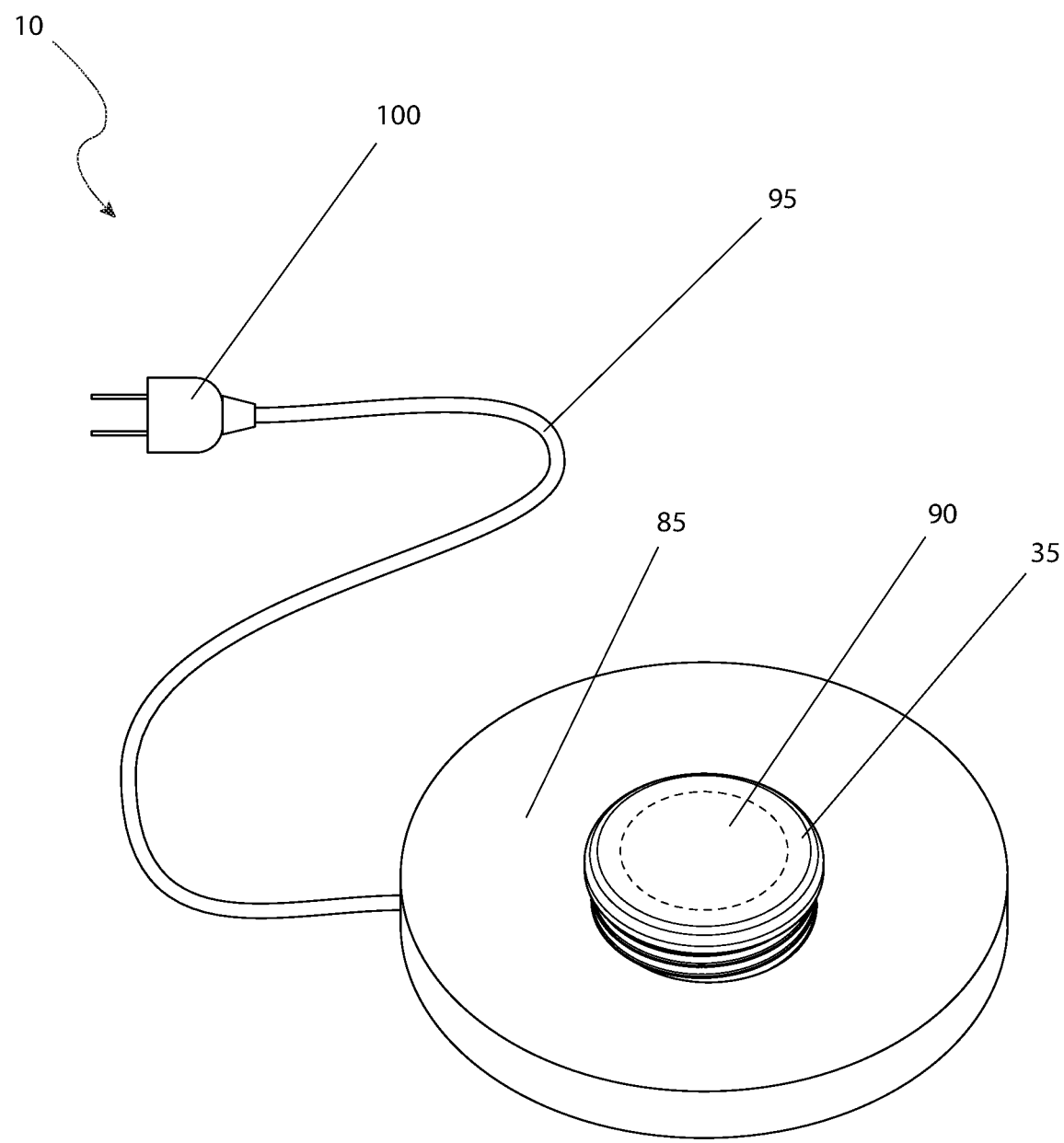
FIG. 3 is a perspective view of a wireless charging pad as used with the infant pacifier, according to the preferred embodiment of the present invention.

Referring now to FIG. 3, a perspective view of a wireless charging pad 85 as used with the pacifier 10, according to the preferred embodiment of the present invention is shown. The electronics module 35 is provided with an internal rechargeable battery 90 (shown via a dashed line due to its hidden nature). The wireless charging pad 85 is connected by a power cable 95 to a power source 100 of conventional design. The wireless charging pad 85 is envisioned to be compatible with the wireless standard "Qi" as developed by the Wireless Power Consortium (WPC) for inductive charging over distances of up to forty millimeters (40 mm.). The wireless charging pad 85 is compatible with manufacturers including but not limited to: Samsung®, Apple®, Sony®, LG®, HTC®, Huawei®, Nokia®, Motorola®, or Blackberry®. Additional technical features and limitations of the wireless charging pad 85 are not intended to be limiting factors of the present invention.

Figure 4:
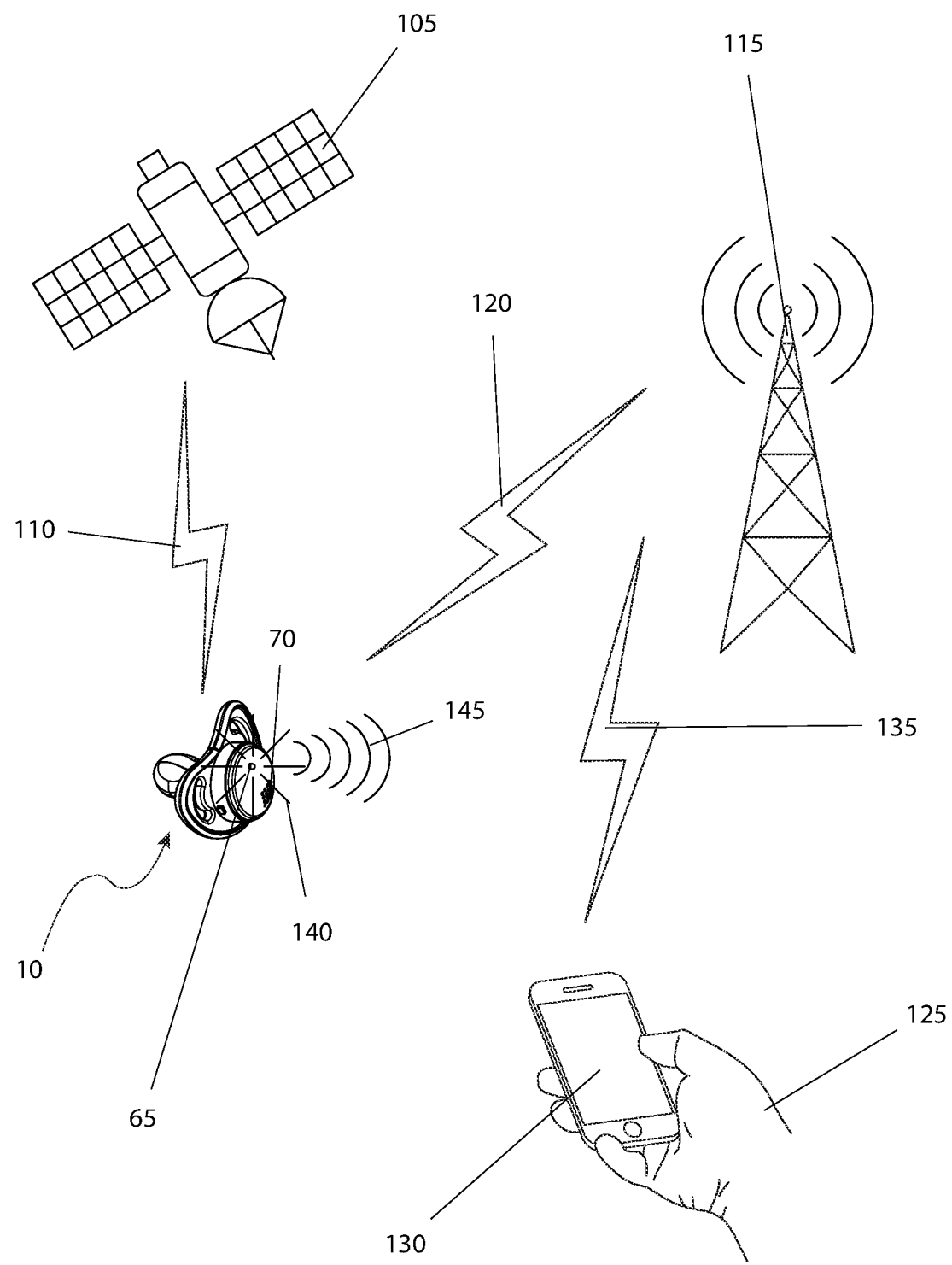
FIG. 4 is a pictorial view of the infant pacifier, shown in a utilized state, according to the preferred embodiment of the present invention.

Referring next to FIG. 4, a pictorial view of the pacifier 10, shown in a utilized state, according to the preferred embodiment of the present invention is disclosed. The pacifier 10 receives global positioning satellite GPS location information via the GPS array 105 on a first radio frequency (RF) signal 110. The location information is then relayed to the cellular data network 115 via a second radio frequency (RF) signal 120. Finally, location and bidirectional control data is provided to a user 125, such as a parent or care provider with the use of a personal electronic device 130 via a third radio frequency (RF) signal 135. With the use of a dedication application on the personal electronic device 130, compatible with at least Apple® and Android® devices, the user 125 may see the location of the pacifier 10 on a map on the screen anywhere in the world. Also, with the use of dedicated software screen buttons on the personal electronic device 130, the user 125 may activate the indicator light 65 to produce illumination 140 and/or activate the alarm speaker 70 to produce an audible alert 145. In such a manner, the location of the pacifier 10 may be found in a dark room, or found even if covered by blankets, clothes, or alongside of furniture cushions. Once the pacifier 10 has be located, a software screen button on the personal electronic device 130 would be pressed to stop both audible and visual alerts.

Figure 5:
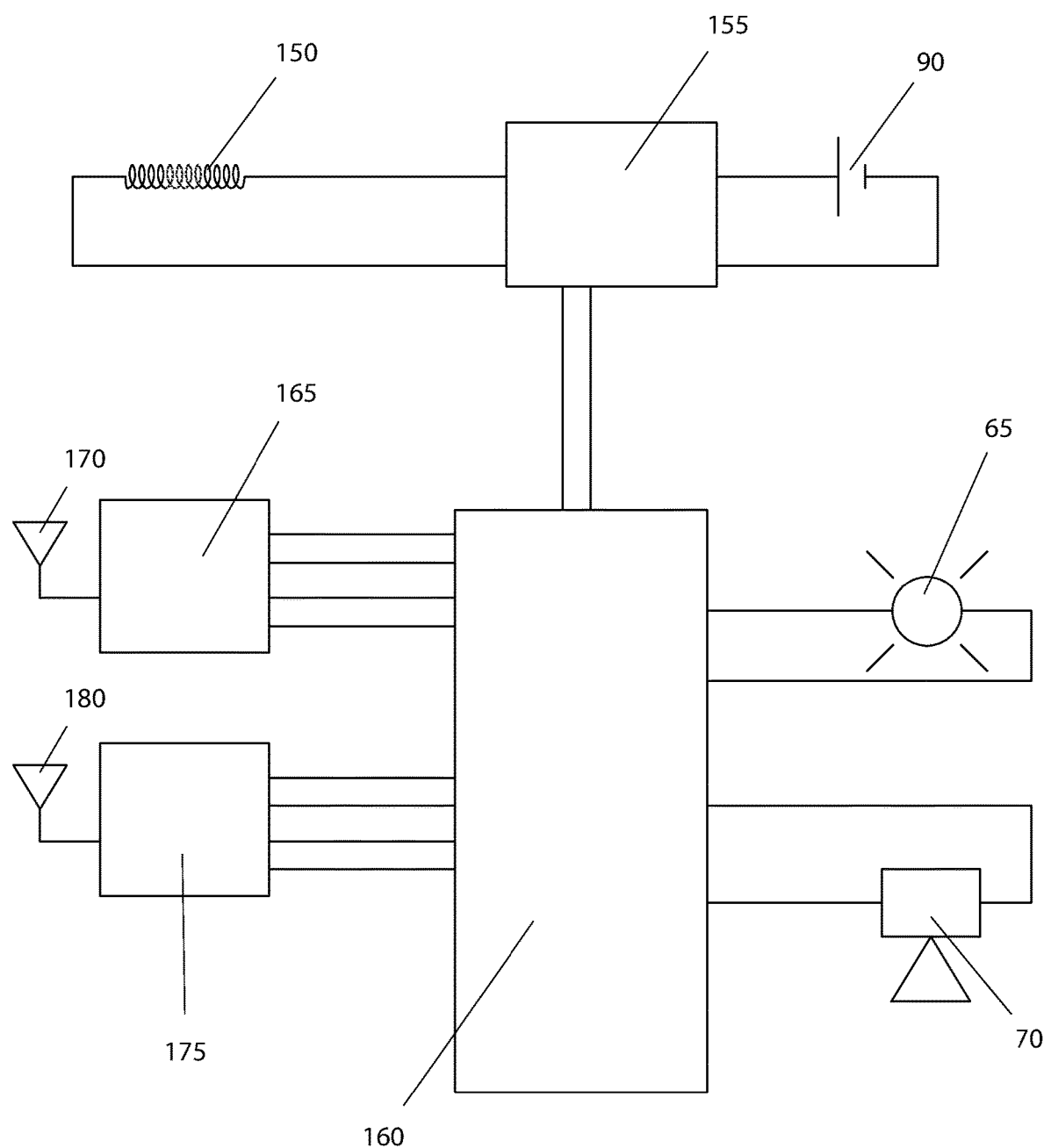
FIG. 5 is an electrical block diagram of the electronics module, as used with the infant pacifier, according to the preferred embodiment of the present invention.

Referring to FIG. 5, an electrical block diagram of the electronics module 35, as used with the pacifier 10, according to the preferred embodiment of the present invention us depicted. Charging power from the wireless charging pad 85 (as shown in FIG. 3) would be received by a pickup coil 150 and routed to a charge controller 155 to charge the rechargeable battery 90. Power would also be routed to a main control circuit 160, envisioned to be a single board computer (SBC) running a dedicated operating system. A GPS receiver 165 equipped with a GPS antenna 170 receives the first radio frequency (RF) signal 110 (as shown in FIG. 4) and transmits necessary resultant location data to the main control circuit 160. A cellular data transmitter 175, equipped with a cellular antenna 180, both receives and transmits data via the second radio frequency (RF) signal 120 (as shown in FIG. 4). Dedicated outputs from the main control circuit 160 then operate the indicator light 65 and the alarm speaker 70.

2. Operation of the Preferred Embodiment

The preferred embodiment of the present invention can be utilized by the common user 125 in a simple and effortless manner with little or no training. It is envisioned that the pacifier 10 would be constructed in general accordance with FIG. 1 through FIG. 5. The user 125 would procure the pacifier 10 from conventional procurement channels such as discount stores, department stores, drug stores, electronic retailers, mail order and internet supply houses and the like. Special attention would be paid to overall system components, color, sizes of pacifier body 15, kit components and quantity, and the like.

After procurement and prior to utilization, the pacifier 10 would be prepared in the following manner: the electronics module 35, in a removed state from the pacifier body 15, is placed upon the wireless charging pad 85 or an initial charging; the electronics module 35 is then paired with the dedicated application on the personal electronic device 130 for initial configuration; the electronics module 35 is then inserted into the attachment collar 40 using the male thread system 75 and the female thread system 80 and secured via the release button 45. At this point in time, the pacifier 10 may be given to the child for utilization.

Should the pacifier 10 become lost, the following procedure would be initiated: the dedicated application would be initiated on the personal electronic device 130 by the user 125. The physical location of the pacifier 10 would be viewed upon a map on the screen on the personal electronic device 130. Should the personal electronic device 130 be nearby, the user 125 may direct the electronics module 35 to produce either illumination 140 and/or an audible alert 145 by the indicator light 65 and the alarm speaker 70 respectively thus allowing for location. Once located, the dedicated application on the personal electronic device 130 would be directed to cease energization of the indicator light 65 and the alarm speaker 70, allowing the user 125 to return the pacifier 10 to the child.

Should the electronics module 35 require recharging, it would be removed from the pacifier body 15 following general direction provided in FIG. 1. The electronics module 35 would then be placed on the wireless charging pad 85 for charging for an appropriate period of time. When fully charged, the electronics module 35 would be returned to the pacifier body 15. A similar process would be used when changing out the pacifier body 15 for a larger unit, or for replacing the pacifier body 15 when worn or damaged. The electronics module 35 and the pacifier body 15 would also be separated when washing, cleaning, or sanitizing the pacifier body 15 to prevent damage to the electronics module 35.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An infant pacifier consisting of:
  a pacifier body including a base plate and a nipple extending from a front surface of the base plate, wherein the base plate includes an attachment hole configured for use with a pacifier retention clip;
  an attachment collar fixedly secured to a rear surface of the base plate, wherein the attachment collar is opposite the nipple;
  an electronics module configured to be housed within the attachment collar during use, wherein the electronics module is removable from the attachment collar to permit washing of the pacifier body;
  a release button disposed on the attachment collar, wherein the release button is configured to release the electronics module from the attachment collar upon application of physical pressure along a force travel path;
  a male thread system disposed on the electronics module and a female thread system disposed on the attachment collar, wherein the male thread system and the female thread system are configured to mate with each other to secure the electronics module within the attachment collar, and wherein a twisting force travel path is applied to disengage the electronics module from the attachment collar along a removal travel path;
  an indicator light and an alarm speaker disposed on a rear surface of the electronics module, wherein the indicator light and the alarm speaker are waterproof;
  a rechargeable battery disposed within the electronics module;
  a wireless charging pad configured to be connected to a power source, wherein the wireless charging pad is compatible with a Qi wireless standard for inductive charging over distances of up to 40 mm, and wherein the wireless charging pad is configured to recharge the rechargeable battery;
  a GPS array disposed within the electronics module, wherein the GPS array is configured to receive global positioning satellite location information via a first radio frequency signal;
  a cellular data transmitter disposed within the electronics module, wherein the cellular data transmitter is configured to relay the global positioning satellite location information to a cellular data network via a second radio frequency signal; and,
  a dedicated application residing on a personal electronic device, wherein the dedicated application is configured to: receive the global positioning satellite location information via a third radio frequency signal; display the location of the infant pacifier on a map on a screen of the personal electronic device; and provide bidirectional control data to activate or deactivate the indicator light and the alarm speaker.

\* \* \* \* \*